(12) United States Patent
Webster et al.

(10) Patent No.: US 9,908,404 B2
(45) Date of Patent: Mar. 6, 2018

(54) FUEL CAP COVER

(71) Applicant: Flugwerk Design Studio, LLC, St. Charles, MO (US)

(72) Inventors: Carl J. Webster, St. Charles, MO (US); Mary A. Webster, St. Charles, MO (US)

(73) Assignee: FLUGWERK DESIGN STUDIO, LLC, St. Charles, MO (US)

( * ) Notice: Subject to any disclaimer, the term of this patent is extended or adjusted under 35 U.S.C. 154(b) by 0 days.

(21) Appl. No.: 14/212,617

(22) Filed: Mar. 14, 2014

(65) Prior Publication Data

US 2014/0263318 A1    Sep. 18, 2014

Related U.S. Application Data

(60) Provisional application No. 61/790,362, filed on Mar. 15, 2013.

(51) Int. Cl.
  *B65D 25/28* (2006.01)
  *B60K 15/04* (2006.01)
  *B60K 15/03* (2006.01)

(52) U.S. Cl.
  CPC ........... *B60K 15/0406* (2013.01); *B60K 2015/03375* (2013.01)

(58) Field of Classification Search
  CPC ........... A41D 2400/52; A41D 2400/34; A41D 13/081; A41D 19/0068; A41D 19/0075; A41D 19/01558; A41D 13/082; A41D 19/002; E05B 1/0069; Y10S 16/904; Y10S 16/12; Y10S 248/905; Y10S 16/30
  USPC ........... 220/212.5; 2/16, 435, DIG. 12, 904, 2/110.1
  See application file for complete search history.

(56) References Cited

U.S. PATENT DOCUMENTS

| | | | | |
|---|---|---|---|---|
| 4,240,157 A | | 12/1980 | Peters | |
| 4,817,691 A | * | 4/1989 | Lau | ............... 141/390 |
| 5,020,160 A | * | 6/1991 | Cano | ............. A41D 19/0093 2/158 |
| 5,432,954 A | * | 7/1995 | Taylor | ............. A41D 19/01594 2/158 |
| 5,473,789 A | * | 12/1995 | Oster | ............. 15/104.94 |
| 6,367,081 B1 | * | 4/2002 | Harris | ............... 2/16 |
| 6,643,846 B2 | | 11/2003 | Turner-Antonsen | |
| 7,854,040 B1 | | 12/2010 | Ramos | |
| 8,387,165 B1 | * | 3/2013 | Sakin | ............... 2/16 |

(Continued)

OTHER PUBLICATIONS

GermBloc travel series products (at www.germbloc.com).
Pull 'N Pump wipes and dispenser (at www.crownproductsonline.com/pull-npump1.html).

*Primary Examiner* — Shawn M Braden
(74) *Attorney, Agent, or Firm* — Polster Lieder Woodruff & Lucchesi, L.C.

(57) ABSTRACT

A fuel cap cover is provided which protects its user from the spread of pathogens and inhibits contact with noxious chemicals such as liquid fuel residues in a fuel station environment. The fuel cap cover fits conveniently over the fuel cap in the fuel supply inlet enclosure when not in use. The fuel cap cover is flexible and has pockets which conveniently fit over the user's thumb and fingers. It is dimensioned to readily grasp and manipulate the fuel pump handle, operational controls, and other surfaces in a fuel station environment, and then slip easily off and back onto the fuel cap to be stored until its next use.

19 Claims, 3 Drawing Sheets

(56) References Cited

U.S. PATENT DOCUMENTS

| | | | |
|---|---|---|---|
| 8,621,675 B2* | 1/2014 | Aspiro | 4/245.1 |
| 8,919,838 B2* | 12/2014 | Zimmermann et al. | 294/25 |
| 2006/0200891 A1 | 9/2006 | Geraci | |
| 2008/0016601 A1* | 1/2008 | McCrorey et al. | 2/159 |
| 2009/0056844 A1 | 3/2009 | Schanz | |

* cited by examiner

FUEL CAP COVER

CROSS REFERENCES TO RELATED APPLICATIONS

This application claims the benefit of U.S. Provisional Application No. 61/790,362, filed on Mar. 15, 2013. The above application is incorporated herein by reference in its entirety.

FIELD

The subject matter described herein relates generally to a fuel cap covering which may serve as an inhibitor to disease carriers and noxious chemicals in fuel refilling station and other environments.

BACKGROUND

Vehicle fuel refilling stations such as those including the self-service gas pumps used by most personal and commercial vehicles, have been identified as one of the prime points of contact with bacteria, viruses, fungi, prions and other pathogens which can be transmitted by personal contact. (Los Angeles Times; "Germiest Place in America? The Gas Pump", Oct. 25, 2011). This hazard is becoming accentuated as disease carrying pathogens become ever increasingly resistant to modern antibiotics. ("increasing Resistance to Antibiotics is Like Ticking Time Bomb, says England's Medical Chief Davies", TopNews.net/nz Mar. 11, 2013).

Additionally, vehicle fuel refilling in the modern age is primarily a self-service endeavor, and subjects customers to ongoing exposure to liquid fuel residues and their odors left on their skin in the course of filling their fuel tank.

Despite the growing risk of antibiotic-resistant pathogen transmission in the fuel refilling environment and the chronic risk of exposure to noxious chemicals during self-service at the pump, very little protection is currently offered to address these issues. Some of the reasons for the virtual lack of available protection devices are believed to be the absence of available devices that may be conveniently stored and accessed, and that are able to maximize protection and ease of use.

Thus, a need exists for hand protection for use in the vehicle refueling and other environments that limits exposure to noxious chemicals and protects against various pathogens, and is conveniently stored and easy to use.

SUMMARY OF THE INVENTION

Accordingly, a fuel cap cover is provided which addresses the needs and provides the advantages outlined herein. The fuel cap cover of the invention may be used to limit exposure to noxious chemicals and protects against various pathogens present in a fuel station environment, and is conveniently stored and easy to use. Additionally, it offers enhanced grip for loosening and removing tightly sealed or stubborn fuel tank caps, and provides a buffer between its user and cold metallic components of modern day refueling nozzles during extreme cold conditions, hence eliminating the need to soil gloves for use in refueling and reducing the chances of static sparks being generated by cotton or fabric gloves when used within vaporous fuel environment. The fuel cap cover is fittable to and removable from the fuel cap within the conventional vehicle's fuel inlet compartment. The cover includes a body portion of generally sturdy, yet flexible material configured to substantially cover a fuel cap. The cover has flexible pockets attached to the body portion dimensioned for flexing fingers inserted in the pockets to grasp and manipulate while the cover is in use. The cover comprises a material having resistance to noxious chemicals and pathogens.

BRIEF DESCRIPTION OF THE DRAWINGS

The presently disclosed subject matter will be better understood from reading the following description of non-limiting embodiments, with reference to the attached drawings, wherein below.

DETAILED DESCRIPTION OF THE INVENTION

Figure 1:
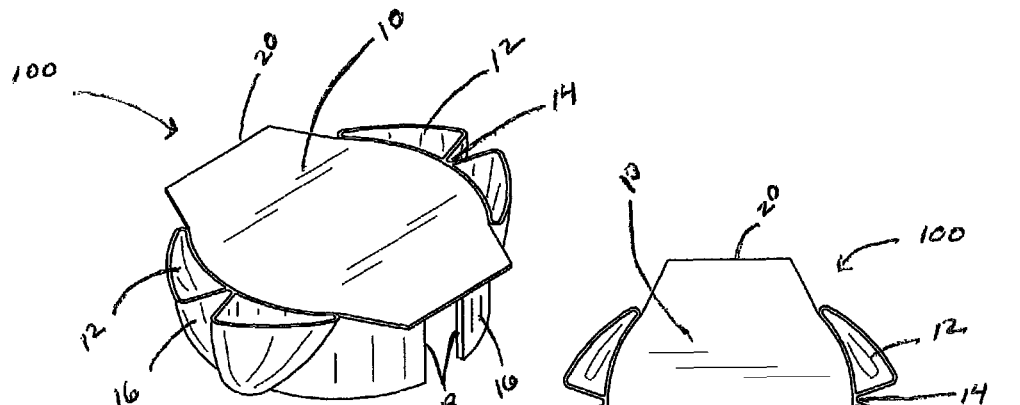
FIG. 1 is a perspective view of the fuel cap cover in accordance with an exemplary embodiment of the present invention.
Figure 2:
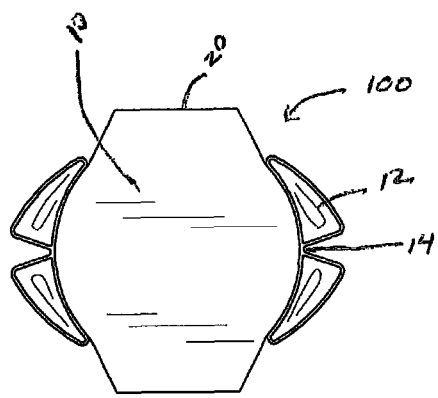
FIG. 2 is a top view of the fuel cap cover shown in FIG. 1.
Figure 3:
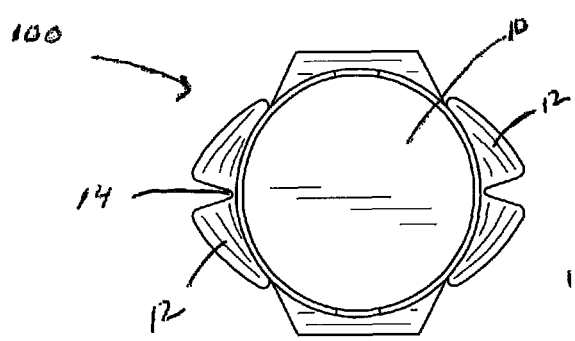
FIG. 3 is a bottom view of the fuel cap cover shown in FIG. 1
Figure 4:
FIGS. 4 and 5 are side views of the fuel cap cover shown in FIG. 1.
Figure 5:
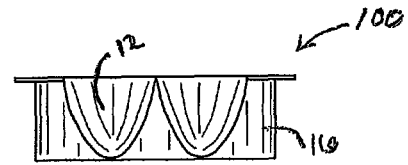
Figure 6:
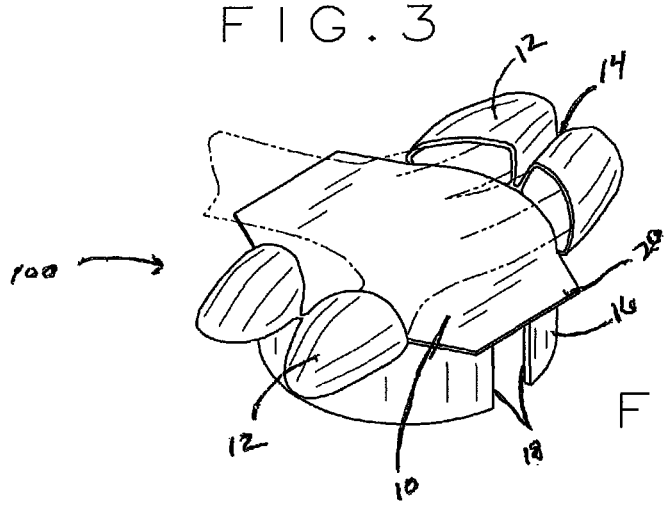
FIG. 6 is a perspective view of the fuel cap cover shown in FIG. 1 with a schematic depiction of the cover being held by a human hand.

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments as described and shown herein provide a fuel cap cover which protects its user from the spread of pathogens and inhibits contact with noxious chemicals such as organic liquid fuel residues and vapors in a fuel station environment. Since the fuel cap cover fits conveniently over the fuel cap, it may be readily stored on the fuel cap in the fuel supply inlet enclosure when not in use, removed for use, and then replaced on the cap when fueling is complete. The fuel cap cover comprises a sturdy, yet flexible body and has pockets which conveniently fit over the user's thumb and fingers. It is dimensioned to easily grasp and manipulate the fuel pump handle, operational controls, and other surfaces in a fuel station environment while protecting the user's hand from contact, and then slipped easily off and back onto the fuel cap to be stored until its next use.

In various embodiments, devices of the present invention, either due to the nature of the material composition or texturing of the cover's gripping surface, or both, improve the user's ability to loosen and remove tightly sealed or balky fuel tank caps. They also serve to protect the user from undue exposure to cold metallic components of modern day refueling nozzles during the extreme cold. This helps to eliminate the need to put on gloves, which may result in their soiling when gloves are used in refueling. It also reduces the chances of static sparks being generated by any cotton or fabric gloves when used within vaporous fuel environments.

The cap cover may be fabricated of one or more of various sturdy, flexible materials that have a broad temperature range and are generally impermeable to pathogens and to noxious chemicals of the type encountered at a fueling station. These may include, but are not limited to silicone, rubber and latex. In some embodiments, the cover may be made using an injection molded process, and may be of one piece construction with no detachable components. Methods of construction by injection molding and otherwise are generally known to those skilled in the art. Various embodiments may be cleaned with hot water and soap or alcohol as needed, and reused over any desirable time frame.

Among the characteristics which materials used for the fuel cap covers of the invention may advantageously possess, include castability, superior physical properties such as flexibility, high tear strength and wear resistance, ability to perform in both very hot and cold temperature ranges, impermeability to gasoline, diesel fuel, benzene, methanol, amines and other hydrocarbons, and impermeability to pathogens such as anti-biotic resistant germs, bacteria, viruses, fungi and prions. Suitable materials may include one of, or combinations of, silicone and fluorosilicone rubbers, such as Silastic, propylenes and tetra-fluoroethylenes, polyurethane rubbers such as Adiprene, Estane and Genthane, polysulphide rubbers such as Thiokol, chloroprene rubbers and nitrile rubbers. Other materials known to those skilled in the art may be substituted in place of the above, provided they meet the requirements for flexibility, performance and resistance as described herein.

The fuel cap covers of the invention may optionally be impregnated or otherwise treated with one or more anti-pathogenic agents to enhance their protective properties and to assist in removal of germs and/or other pathogens on pump handles and other surfaces frequently touched in fuel station environments. See, e.g., U.S. Pat. No. 5,466,726, issued Nov. 14, 1995; "Antibacterial, Antifungal Silicone Rubber Composition". In this embodiment, the anti-bacterial agents may provide additional protection by killing pathogens at any contact points as a fuel cap cover of the invention is used to handle the fuel fill nozzle 300 and other fuel dispenser controls and components, thus also inhibiting the spread of pathogens to any unprotected patrons during their next fuel re-filling.

Referring to the drawings, in an embodiment of the invention, the cover 100 may be configured to hold the shape of the fuel cap 200 it is designed to be used with, e.g., when stored on top of a vehicle's fuel cap. Thus fittable to and removable from the fuel cap 200, the cover 100 stows away atop a vehicle's fuel cap 200 while occupying only a slight area of the vehicles fuel box cavity 400. See FIG. 7. The cover has a, e.g., generally circular body portion 10 configured to substantially cover a fuel cap 200. Attached to the body portion 10 is a plurality of pocket areas 12. See FIGS. 1-5. The material employed, as detailed above, has sufficient elasticity to allow the fuel cap cover pocket areas 12 to flex with the hand movements of its user required to operate all phases of the vehicle refueling process (see FIGS. 6-11). In certain embodiments, the elastic character of the body portion 10 and pockets 12 serves to aid the cover 100 in fitting snugly over and staying on the fuel cap when it is covering the cap. See FIG. 7.

In one embodiment, the fuel cap cover 100 has matching finger and thumb pockets 12, e.g., at opposing positions of the body portion 10 that generally covers the top of the fuel cap 200. Each finger pocket may have a divider 14, e.g., between the center or some other dimension of each pocket 12, which allows fingers of the user's hand to be able to be moved separately as may be required when operating the fuel flow handle and locking trigger of any modern day refueling nozzle 300. The cap cover 100, as so constructed, may readily be used by both right and left handed individuals. See FIGS. 10 and 11.

Additionally, in certain embodiments, the fuel cap cover 100 is so constructed such that a sidewall portion 16 extends circumferentially around and downwardly from the body portion 10 to aid in gripping and holding the fuel cap in conjunction with the body portion 10. The sidewall portion 16 may, in certain embodiments, have notched areas 18. See FIGS. 1, 4 and 10. Where coverage of variously dimensioned caps is desired, the notched areas 18 of the cap cover 100 allow it to expand out by opening fingers as in a partially opened hand movement.

The notched areas 18 also allow easy re-installation of the fuel cap cover 100 of the invention onto fuel caps 200 of varying dimensions (or these may be configured to have the cover fit very compactly onto a cap of a particularly specified dimension). These notched areas 18 also serve to limit interference by the cap cover 100 with fuel cap tether cords found on some vehicles.

In a further embodiment, the body portion 10 may have flap portions 20 extending outwardly from segments of the periphery of the body portion a desired amount to cover wider hands of a user when, e.g., such a user is holding the fuel fill nozzle 300. See, e.g., FIGS. 1, 2, 3, 6 and 11.

In various embodiments, the cap cover of the invention is designed to be utilized with fuel caps on vehicles using any fuel type, such as either gasoline or diesel fuel.

Figure 11:
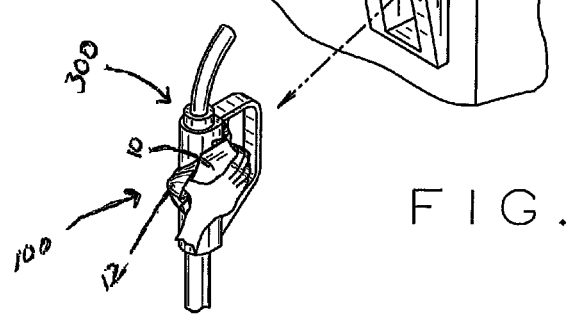
FIG. 11 is a perspective view of the fuel cap cover of FIG. 1 schematically depicting it in use as it is being held by a human hand and used to grasp and manipulate a fuel pump handle.

In use according to the invention, the patron intending to use a self-serve fuel pump nozzle 300 accesses the fuel supply inlet cap 200 and the cover 100 of the invention by opening the filler box lid 500 and placing his fingers and thumb in the pockets 12 adjacent the body portion 10 of the fuel cap cover 100 as it is attached to the fuel cap 200. As shown in the Figures, the cover may then be used to grasp and remove the fuel cap 200, such as by twisting the cap (FIGS. 8 and 9), without physical contact by the hand with the cap 200. Similarly, the hand within the fuel cap cover 100 can readily manipulate all the controls, including pushing the fuel grade selection button (FIG. 10) or any other fuel dispensing command buttons, such as payment type, all without personal contact by the hand. Finally, devices within the fuel station environment, including the fuel fill nozzle 400 handle and locking mechanism may be manipulated using the cap cover 100 of the invention, to lift the nozzle from its saddle receptacle and pulling the lever and locking it into the "on" position (FIG. 11).

The cap cover 100 may be set atop the nozzle by placing the notched areas 18 on the sidewall portion 16 of the cap cover 100 atop the fuel filler nozzle 300 handle. FIG. 11. When the fuel tank is replenished and the nozzle is ready to be returned to the fuel pump nozzle saddle of the pump, the fingers are placed within the pockets 12 of the fuel cap cover 100 of the invention, which was perched atop the fuel nozzle 400 handle. The pump nozzle may now be removed from the vehicle and returned to the pump nozzle saddle receptacle.

Figure 7:
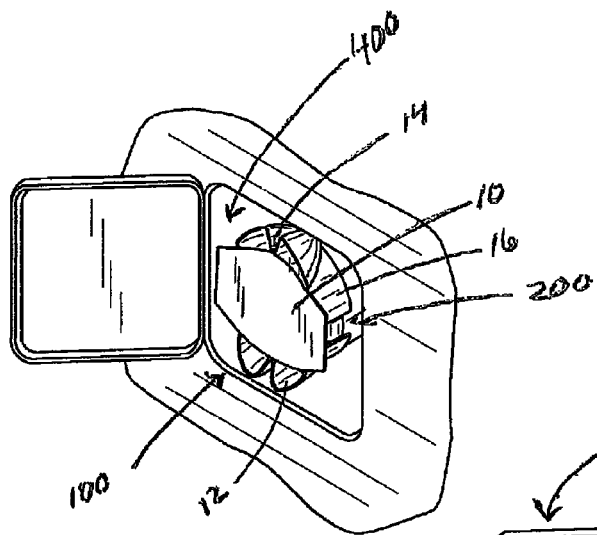
FIG. 7 is a perspective view of the fuel cap cover shown in FIG. 1 schematically depicting it in use fitted upon the fuel cap located inside a vehicle's fuel supply inlet enclosure.
Figure 8:
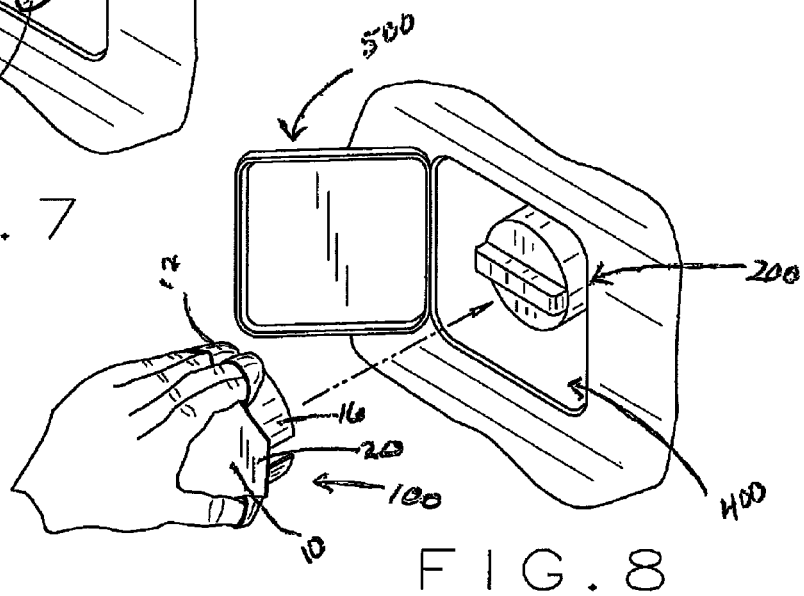
FIG. 8 is a perspective view of the fuel cap cover shown in FIG. 1 with a schematic depiction of the cover as it is being held and positioned to grasp and twist off a fuel cap.
Figure 9:
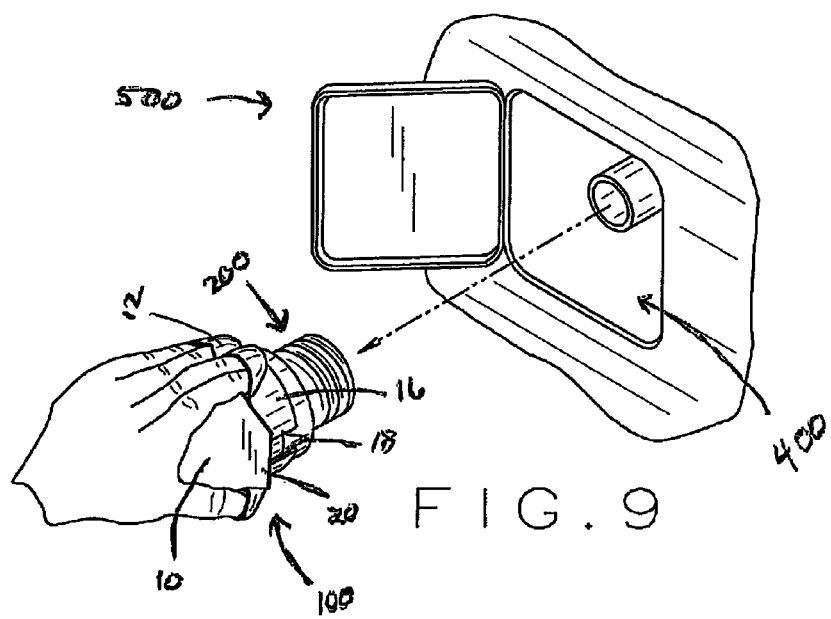
FIG. 9 is a perspective view of the fuel cap cover shown in FIG. 1 schematically depicting it in use as it grasps and holds a fuel cap.
Figure 10:
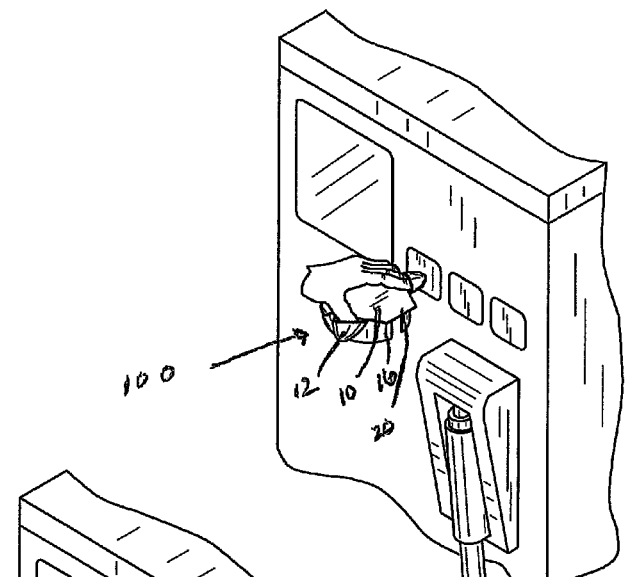
FIG. 10 is a perspective view of the fuel cap cover of FIG. 1 schematically depicting it as it is being used to operate controls on a station's fuel dispenser.

The fuel cap cover 100 of the invention may then be used to place the fuel cap 200 back on the fuel supply inlet pipe (FIG. 9), and then stored once again as a cover 100 to the fuel cap 200 within the fuel box cavity 300 (FIG. 7).

The fuel cap cover 100 of the invention minimizes or eliminates contact by the user with fuel additives such as Benzene and other additives of BETEX compounds in fuels that are known carcinogens and health hazards. These are believed to contribute to, but are not limited to, lung, skin and kidney cancer, leukemia and memory loss. It also inhibits exposure to pathogens, including but not limited to bacteria, viruses and other infectious agents found in public environments with commonly touched surfaces. Thus, this invention in its various embodiments serves to reduce or eliminate actual contact with these elements and the daily risks they represent.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A fuel cap cover for a fuel cap having a top surface with a perimeter, the fuel cap cover comprising:
    a body portion of flexible and elastic material, said body portion being generally planar and being largely coextensive in size and shape with the top surface of the fuel cap to substantially cover and snugly fit atop the top surface of the fuel cap, the fuel cap cover having at least two pocket areas attached to the body portion of the fuel cap cover at substantially opposite positions along a perimeter of the top surface of the fuel cap and extending in a substantially downwardly direction from the perimeter of the top surface of the fuel cap when the fuel cap cover is placed atop the fuel cap and dimensioned for flexing thumb or fingers inserted in the pocket areas to grasp and manipulate the fuel cap when the fuel cap cover is atop the fuel cap, and wherein the body portion and the one or more pocket areas in combination aid the fuel cap cover to hold the shape of the top surface and perimeter of the fuel cap when atop the fuel cap, the fuel cap cover being fittable to and removable from the fuel cap, and further being configured to stow away atop the fuel cap while the fuel cap is located in a fuel box cavity of a vehicle, and further comprising a material having resistance to noxious chemicals and pathogens.

2. The fuel cap cover of claim 1 further comprising a sidewall portion extending circumferentially around and downwardly from the body portion.

3. The fuel cap cover of claim 1 further comprising one or more notched areas within the sidewall portion.

4. The fuel cap cover of claim 1 further comprising a divider between one or more of the at least two pocket areas.

5. The fuel cap cover of claim 1 further comprising one or more antibacterial agents.

6. The fuel cap cover of claim 1 wherein contact portions of the fuel cap cover are textured to aid the cover in gripping and manipulation.

7. The fuel cap cover of claim 1 wherein the noxious chemicals the material of the cover has resistance to is selected from one or more of the group consisting of:
    Gasoline, diesel fuel, benzene, Betex, methanol, amines and other hydrocarbons.

8. The fuel cap cover of claim 1 wherein the pathogens the material of the cover has resistance to is selected from one or more of the group consisting of:
    Bacteria, viruses, fungi and prions.

9. The fuel cap cover of claim 1 wherein the fuel cap cover serves at least in part as a prophylactic against health hazards selected from one or more of the group consisting of:
    Lung cancer, kidney cancer, skin cancer, leukemia, and memory loss.

10. A fuel cap cover for a fuel cap having a top surface with a perimeter, the fuel cap cover comprising:
    a body portion of flexible and elastic material, said body portion being generally planar and being largely coextensive in size and shape with the top surface of the fuel cap to substantially cover the solid top surface of the fuel cap, at least two pocket areas attached to and located at substantially opposing positions of the body portion and extending in a direction substantially downwardly from the perimeter of the top surface of the fuel cap when the fuel cap cover is placed atop the fuel cap dimensioned for flexing thumb or fingers inserted in the pocket areas to grasp and manipulate the fuel cap when the fuel cap cover is atop the fuel cap, the fuel cap cover being fittable to and removable from the fuel cap and further comprising a material having resistance to noxious chemicals and pathogens,
    and a sidewall portion extending circumferentially around and downwardly from the body portion of the fuel cap cover and the top surface of the fuel cap when the fuel cap cover is placed atop the fuel cap, wherein the body portion, the sidewall portion and the at least two pocket areas in combination aid the fuel cap cover in fitting snugly over and staying atop the fuel cap when it is covering the fuel cap.

11. The fuel cap cover of claim 10 further comprising one or more notched areas within the sidewall portion.

12. The fuel cap cover of claim 10 further comprising a divider between one or more of the at least two pocket areas.

13. The fuel cap cover of claim 10 further comprising one or more antibacterial agents.

14. The fuel cap cover of claim 10 wherein contact portions of the cover are textured to aid the cover in gripping and manipulation.

15. The fuel cap cover of claim 10 wherein the noxious chemicals the material of the cover has resistance to is selected from the group consisting of:
   Gasoline, diesel fuel, benzene, Betex, methanol, amines and other hydrocarbons.

16. The fuel cap cover of claim 10 wherein the pathogens the material of the cover has resistance to is selected from the group consisting of:
   Bacteria, viruses, fungi and prions.

17. The fuel cap cover of claim 1 wherein the fuel cap cover serves at least in part as a prophylactic against health hazards selected from the group consisting of:
   Lung cancer, kidney cancer, skin cancer, leukemia, and memory loss.

18. A fuel cap cover for a fuel cap, the fuel cap having a top surface with a circumference, the fuel cap cover comprising:

a generally flat body portion of thin, flexible and elastic material, said body portion being sized and shaped and having a circumference largely coextensive in size and shape with the top surface and the circumference of the fuel cap;

four pocket areas attached to the body portion of said fuel cap cover positioned along the circumference of the body portion of the fuel cap cover, the four pocket areas being sized to receive fingers and thumb from at or near the top surface of the fuel cap cover and extending generally downwardly therefrom, the four pocket areas being divided into a first and a second pair of pockets, said first pair of pockets being located substantially opposite the second pair of pockets, and a sidewall portion extending circumferentially around and downwardly from said body portion of the fuel cap cover;

wherein, in combination, the generally flat body portion, the four pocket areas attached to the body portion, and the sidewall portion, provide for a fuel cap cover which stays positioned atop the fuel cap when the fuel cap is stored away in a fuel supply inlet enclosure without blocking closure of the fuel supply inlet enclosure, and is positioned for ready grasping and use where removal of the fuel cap is desired.

19. The fuel cap cover of claim 18 wherein the sidewall portion extending circumferentially around and downwardly from the body portion further comprises one or more notched areas within the sidewall portion.

\* \* \* \* \*